United States Patent [19]

Mauro

[11] Patent Number: 4,652,095

[45] Date of Patent: Mar. 24, 1987

[54] OPTICAL COMPONENT POSITIONING STAGE

[76] Inventor: George Mauro, 2880 Boston Ct., Lantana, Fla. 33462

[21] Appl. No.: 780,411

[22] Filed: Sep. 26, 1985

[51] Int. Cl.$^4$ .................. G02B 21/26; G02B 7/00; B23Q 1/20
[52] U.S. Cl. ................................ 350/531; 350/321; 350/247; 350/319; 269/73; 269/60; 108/143; 356/244
[58] Field of Search ............... 350/531, 321, 247, 255, 350/252, 319, 632, 536; 308/3 R, 3 A; 269/73, 60; 108/143, 137, 20; 33/568, 1 M; 250/428, 442.1; 356/244

[56] References Cited

U.S. PATENT DOCUMENTS

| | | | |
|---|---|---|---|
| 480,245 | 9/1892 | Boyer | 350/531 |
| 3,204,584 | 9/1965 | Mladjan | 108/143 |
| 3,989,358 | 11/1976 | Melmoth | 350/247 |

FOREIGN PATENT DOCUMENTS 307187  3/1932  Fed. Rep. of Germany ...... 350/247

Primary Examiner—Jon W. Henry
Attorney, Agent, or Firm—John M. Brandt

[57] ABSTRACT

An optical positioning stage arranged for the precise movement of light optical components composed of a pair of plates having rail receiving grooves, a pair of rails joining the plates and attached thereto by an adhesive, and a mounting table slideably disposed between the rails and the plates. The mechanical configuration of the unit allows multiple combinations to provide movement in all three dimensions.

7 Claims, 6 Drawing Figures

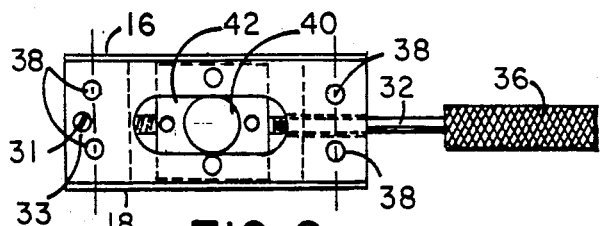
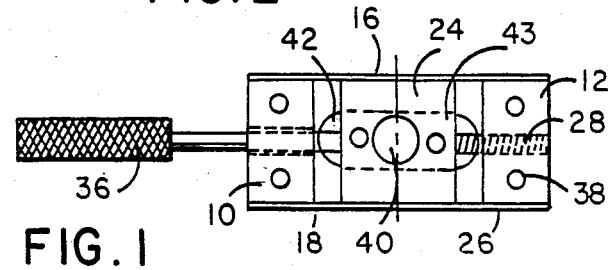
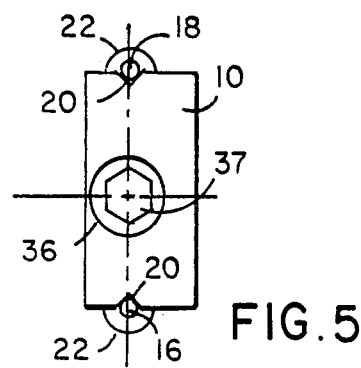
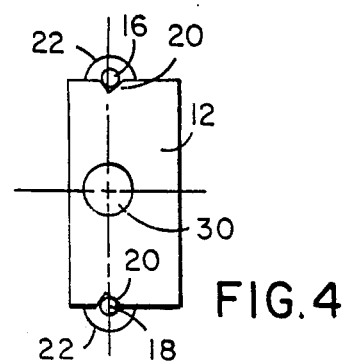
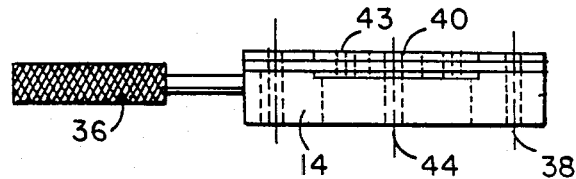
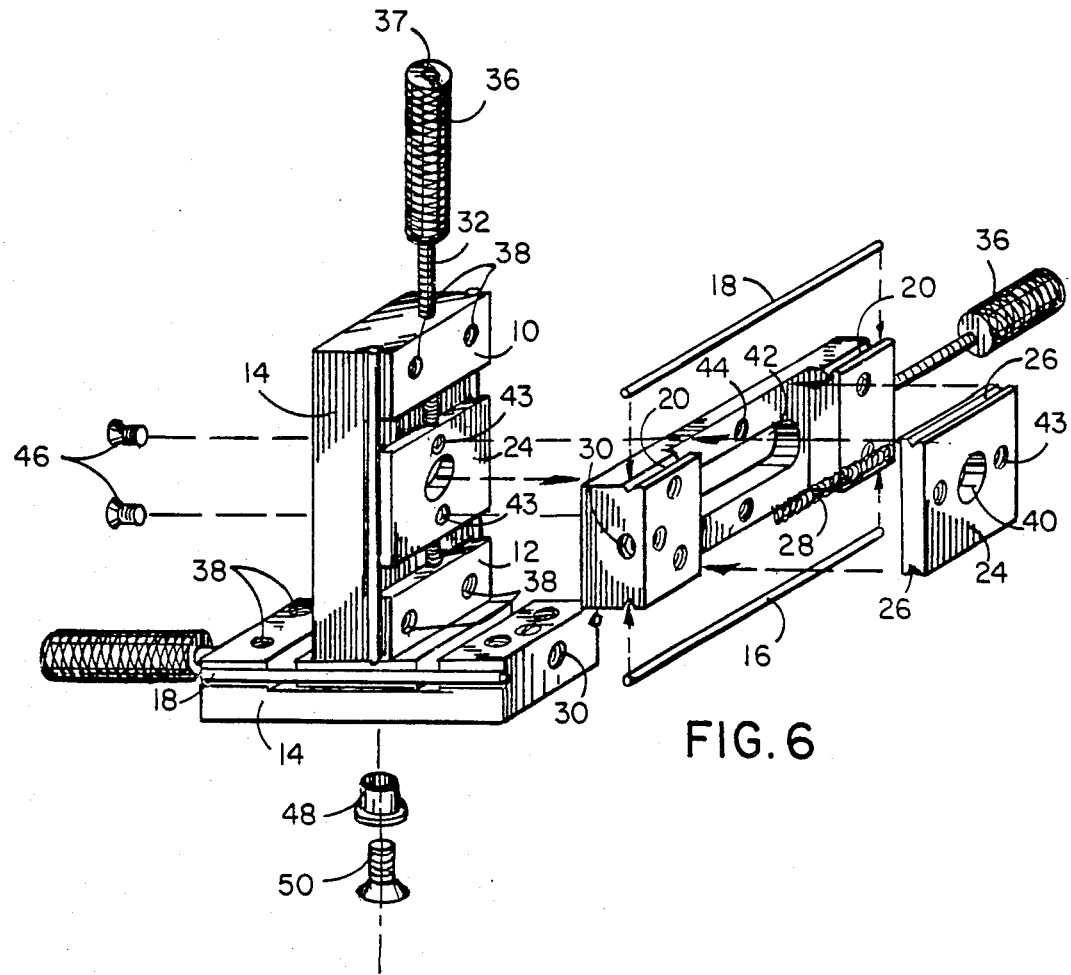

OPTICAL COMPONENT POSITIONING STAGE

BACKGROUND OF THE INVENTION

1. Field of the Invention:

The invention resides in the field of adjustable work piece mounting devices and more particularly relates to precision positioning stages for optical components.

2. Description of the Prior Art:

A great variety of devices designed to precisely position optical components exist in the prior art. For example U.S. Pat. No. 2,637,817, Herbert, discloses a sealed variable cell and a micrometer adjustment. U.S. Pat. No. 3,046,006, Kulicke, Jr., describes a micropositioner using ball bearings and straight races as guides. A positioning table using blocks and guide rods is detailed in U.S. Pat. No. 3,124,018, Gough and finally U.S. Pat. No. 4,372,223, Iwatani, discloses a moving table employing guide surfaces and rotatable rollers.

In contrast to the prior art the stage disclosed herein is assembled with adhesive rather than mechanical joining mechanisms and further is arranged such that two or three basic units may be assembled to form a multiple dimension positioner operable along perpendicular axis.

SUMMARY OF THE INVENTION

The invention may be summarized as an optical component positioning stage comprised of a pair of end plates joined by a pair of parallel rails adhesively attached to grooves in the plates and a mounting table slideably positioned between the rails and the plates. As the stage is designed for the precise movement of light optical type components attached to the mounting table, the assembly of the device may be accomplished by using any of the modern high-strength adhesive materials generally known as epoxies.

The rails, end plates and table are preferably assembled in a jig such that when the attaching adhesive sets, the parts of the unit are permanetly and precisely positioned with respect to one another. Thus while the assembly procedure is relatively simple, a highly accurate device can be produced without the problems of present and future misalignment that are frequently encountered when movable stages are constructed using mechanical couplings such as screws, nuts, bolts, and the like.

In addition to the above unique feature of uniting the components with an adhesive, the stage disclosed herein is arranged such that one may be attached to another at right angles to provide a compound unit to move a work piece in all three dimensions. This is accomplished by the selective positioning of mounting holes and the dual use of other ports in the device.

These and other aspects of the invention are more specifically stated in the description of the preferred embodiment taken with the drawings which follows.

DESCRIPTION OF THE DRAWINGS

FIG. 1 is a top view of the preferred embodiment of the invention;

FIG. 2 is a bottom view of the embodiment of FIG. 1;

FIG. 3 is a front view of the embodiment of FIG. 1;

FIG. 4 is a right side view of the embodiment of FIG. 1;

FIG. 5 is a left side view of the embodiment of FIG. 1; and

FIG. 6 is a partially exploded view of a plurality of the embodiment of FIG. 1.

DESCRIPTION OF THE PREFERRED EMBODIMENT

Referring to FIGS. 1 through 5 the preferred embodiment is illustrated in a plurality of two-dimensional plan views wherein like numbers refer to like parts of the apparatus. As viewed from the top in FIG. 1, the stage consists of end plates 10 and 12 which optionally are integral with and joined by common base 14. A pair of parallel rails, 16 and 18, are disposed in grooves 20 cut in the edges of the plates as is shown in FIGS. 4 and 5.

Although grooves 20 are shown as V-shaped, any other suitable profile such as a half round or oval may also be used.

The rails are adhesively attached to the plates by the application of a quantity of adhesive such as epoxy as indicated at 22. A work piece mounting table 24 of the same transverse dimension as the end plates and having identically positioned grooves 26 is disposed between the rails and the end plates such that it is free to slide laterally between the plates.

Movement of the mounting table 24 may be precisely controlled by biasing the table laterally with coil spring 28 disposed in port 30 and by threaded rod 32 disposed in port 34. A knurled handle 36 attached to the rod facilitates rotating the rod to shift the table against the force of the spring. The spring is held in place by machine screw 31 disposed in port 33 positioned at right angles to port 30. An allen head shaped socket 37 may be placed at the end of the handle 36 to facilitate the turning of the handle.

Additional ports are disposed at various locations in the device to facilitate the use of the stage for transmission optical applications, mounting to other structures and in combination with additional units to provide movement of work pieces in two or three dimensions. In particular, ports 38 in end plates 10 and 12 provide a means to mount the stage on a support and may be tapped to receive a bolt or machine screw.

Aperture 40 in table 24 allows for the transmission of radiation directed at work pieces or optical targets mounted on the table as does slotted port 42 in base 14. Ports 43 are located in the center of table 24 and are preferably tapped to provide a means for fixing work pieces to the table with proper optical mounting fixtures such as lens holders and the like.

As illustrated in FIG. 6, these units may be combined to provide a multidimensional stage by using some of the aforementioned ports. An X-Y combination can be assembled by providing additional tapped holes 44 in base 14 which are at right angles to and spaced about the same distance as ports 42. Machine screws 46 are used for fixing the first stage to the second.

Both stages may then be mounted to a third by inserting a plug 48 in aperture 40 and tapping spring port 30 to receive machine screw 50.

The above described apparatus has a variety of practical applications including for example use as a microscope stage; a positioning device for pin hole and slit apertures; a lens holder; a fiber optic tube positioner; a small crystal positioning support; and as a tool for suspending and positioning the ends of small gas and diode lasers and tubes and rods for axial alignment.

Other uses and modifications will now become apparent to those skilled in the art. Accordingly, the invention is defined by the following claims.

What is claimed is:

1. An optical positioning stage comprising in combination:
   a. a first end plate having a parallel opposed first pair of grooves disposed therein;
   b. a second end plate spaced a selected distance from said first plate, said second plate having a parallel opposed second pair of grooves disposed therein, said grooves spaced apart a distance equivalent to the distance between said first pair of grooves;
   c. a pair of rails, one each disposed in one of said first and one of said second pairs of grooves and adhesively attached to the surface of said grooves; and
   d. a work piece mounting table slideably disposed between said end plates and said rails.

2. The apparatus of claim 1 wherein each end plate has a port located between and parallel to said grooves and wherein said apparatus further includes:
   a. a coil spring disposed in one of said ports, said spring arranged to bear against said table;
   b. threads disposed in the other of said ports; and
   c. a threaded rod turnably disposed in said threaded port and arranged to bear against said table.

3. The apparatus of claim 2 further including a supporting base plate positioned between and attached to both of the said end plates.

4. The apparatus of claim 3 wherein said mounting table has a port centrally disposed therein.

5. The apparatus of claim 4 wherein said mounting table has a pair of mounting holes disposed therein, said mounting holes disposed one on either side of said mounting table port and an equal distance therefrom, aligned in parallel with said rails.

6. The apparatus of claim 5 wherein said base has a slotted port centrally disposed between said end plates.

7. The apparatus of claim 6 wherein said base has a pair of mounting holes disposed therein positioned on an axis perpendicular to an axis joining the centers of said mounting table mounting holes and spaced apart a distance equal to the distance between said mounting table mounting holes.

* * * * *